UNITED STATES PATENT OFFICE.

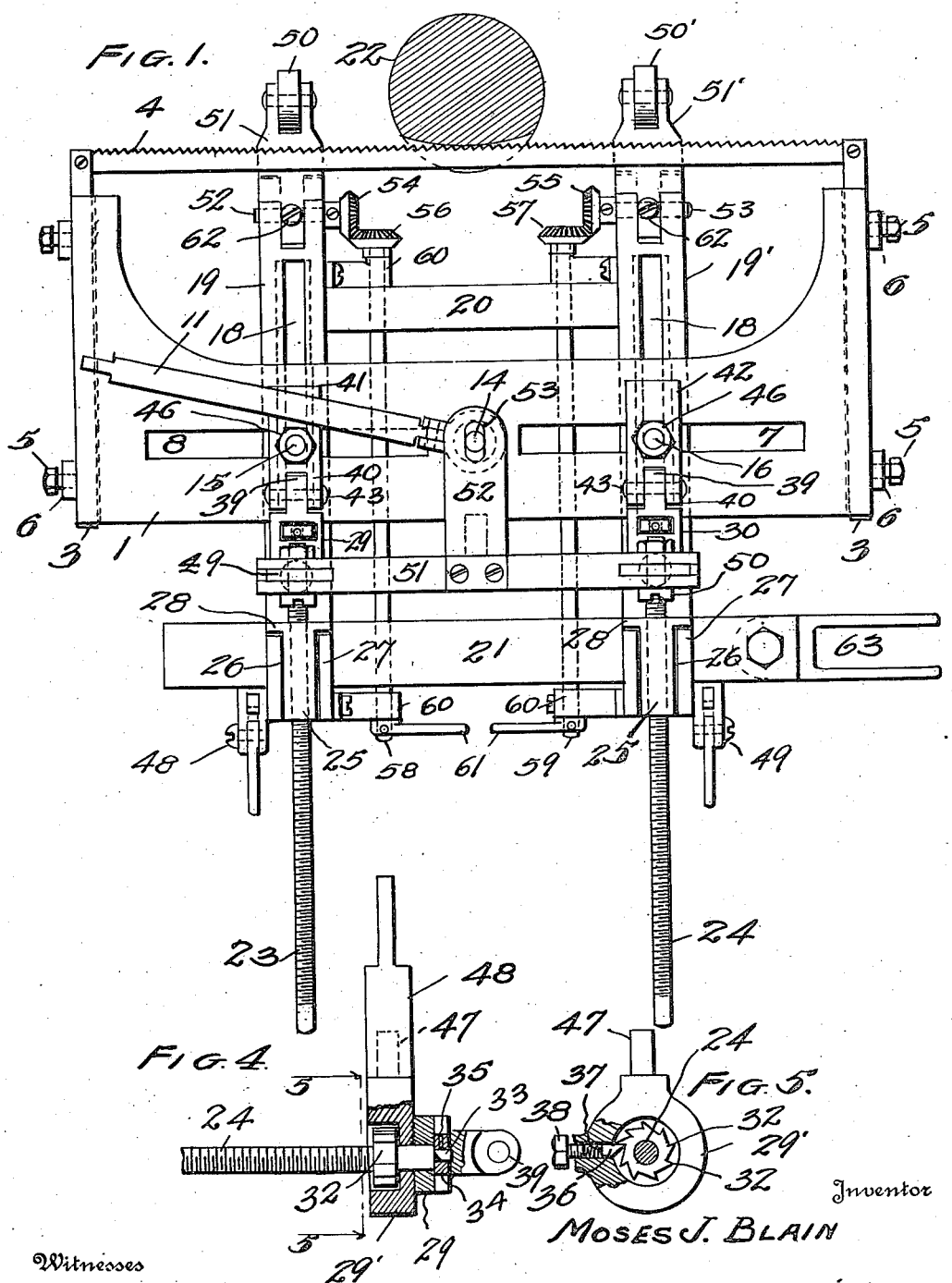

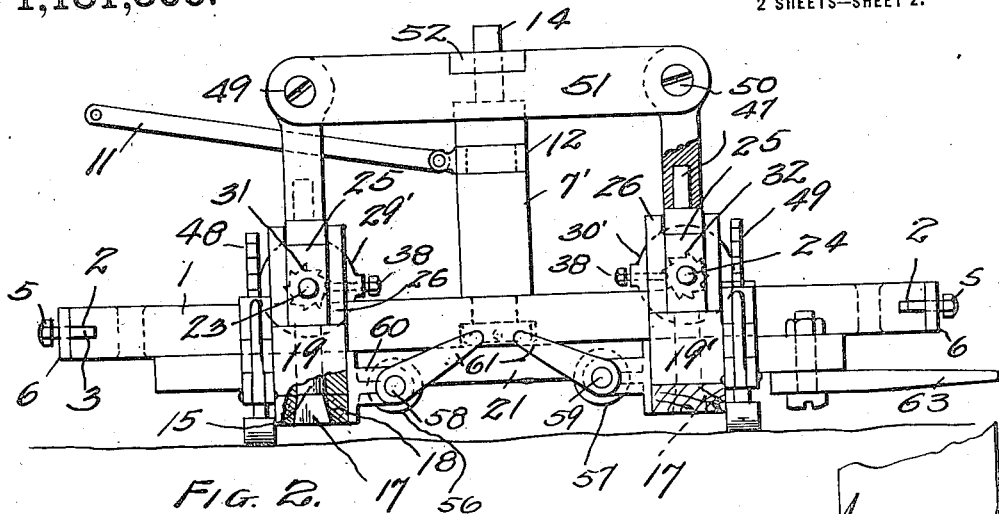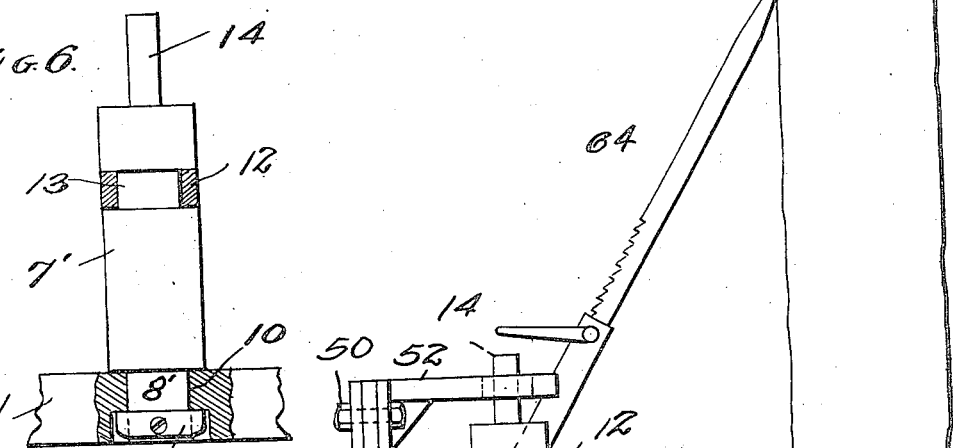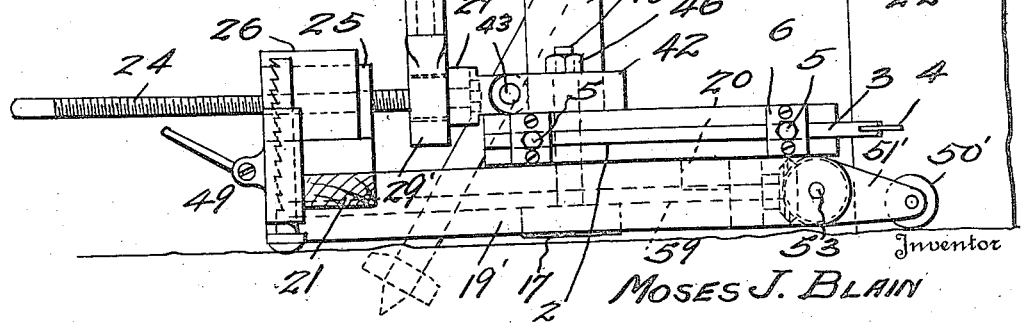

MOSES J. BLAIN, OF TYNGSBORO, MASSACHUSETTS.

SAWING-MACHINE.

1,181,366.

Specification of Letters Patent.    Patented May 2, 1916.

Application filed July 27, 1915. Serial No. 42,132.

*To all whom it may concern:*

Be it known that I, Moses J Blain, a citizen of the United States of America, residing at Tyngsboro, in the county of Middlesex and State of Massachusetts, have invented new and useful Improvements in Sawing-Machines, of which the following is a specification.

The present invention relates to an improved sawing machine designed particularly for the purpose of felling standing timber.

The primary object of the invention is to improve certain features of this class of machines, in order to increase the efficiency and simplify the construction and operation of the machine.

The invention consists in certain novel combinations and arrangements of parts as will be hereinafter more fully described and claimed.

In the accompanying drawings I have illustrated one complete example of the physical embodiment of my invention constructed according to the best mode I have so far devised for the practical application of the principles of my invention.

Figure 1 is a plan view of the sawing machine complete. Fig. 2 is an end view of the machine parts broken away for convenience of illustration. Fig. 3 is a side view of the machine. Fig. 4 is an enlarged detail view partly in section showing the screw bar feed. Fig. 5 is a view taken at line 5—5 of Fig. 4. Fig. 6 is a view in elevation of the pedestal or upright support through which the lateral reciprocating motion is imparted to the saw holder and saw, and showing the connection of the pedestal to the holder.

In the preferred embodiment of my invention, the reciprocable saw holder 1 is preferably a flat metal plate of the proper shape and formed with grooves as 2, 2 in its outer edges extending from end to end thereof and adapted to receive the arms or bars 3, 3, between which the saw blade 4 is suspended and held. The saw blade may be adjusted toward or away from the holder by sliding the bars 3, 3 in their grooves 2 and then tightening up the set bolts 5, four of which are shown each threaded into one of the cross straps 6 at the grooved sides of the holder 1. To permit reciprocating movement of the saw in a lateral direction, a pair of slots 7, 8 are provided near the rear of the holder, the slots being alined and spaced equidistant from the center post or column 7′.

In Fig. 6 the relation of the column 7′ to the holder is best illustrated. The lower reduced end 8′ of the column is passed through an opening in the holder and a collar 9 on this end is seated in the countersunk opening in the holder so that the column may revolve in the bearing 10 provided for it in the holder. The connecting rod 11 from the engine or motor is connected to the column by means of a loose sleeve or band 12 fitted in the annular groove 13 in the column, and the upper free end of the column is formed with a reduced stud portion 14.

In its lateral reciprocating movement the saw holder is guided, through its slots 7, 8, by means of the long bolts 15 16. Each of these bolts passes through one of the slots 7, 8, and each bolt is formed with an elongated, right angularly extending head 17 which is slidable in a groove 18 in the timbers 19, 19′ extending at right angles to the movement of the saw. These timbers are joined by the transverse bars 20 and 21 to form a supporting frame for the machine, and it will be understood that the two bolts 15 and 16 are laterally fixed with relation to the timbers, but that these bolts may slide longitudinally of the timbers, *i. e.* toward and away from the tree 22.

A sliding movement of the saw holder toward the tree is necessary to feed the saw as the work progresses, and as a peculiar movement is imparted to the saw, this sliding movement is also accomplished in a novel manner. Instead of the machine sawing the kerf in the tree on a straight tangential line, it will be seen that the saw is cutting the kerf on a curve, and this is accomplished by imparting to the saw the so-called "woodman's swing," which is imparted to the saw when two men are manipulating the usual hand saw.

The gradual feed of the saw to the tree is accomplished through the medium of a pair of screw bars 23, 24 each passed through a threaded nut 25 seated in a box 26 U-shape in cross section and formed with side wings or walls 27 against which the side flanges 28 of the nuts 5 bear as the screw bar is turned. These nuts are loosely seated in the boxes so that they may be lifted therefrom and the boxes are fixed on the frame. In addition to the support in the nuts 25 each screw feed bar is revolubly journaled in a housing as 29 or 30, and each bar has fixed thereto a ratchet wheel as 31 32, and in Fig. 2 it will be observed that these wheels have their teeth arranged in opposite directions so that through these wheels the feed bar 24 may be turned over to the right and the feed bar 23 turned over to the left to gradually move the saw holder toward the tree. Each bar has at its reduced end 33, a collar 34 and the pin 35 passed through the collar and reduced end holds the screw bar longitudinally immovable with relation to housing, but the bar and its ratchet wheel are free to revolve within the housing. Each disk 29' and 30' is radially bored to accommodate a pawl 36 which is held against its ratchet wheel by a spring 37 and the bolt 38 closes the bore and holds the spring. Through this pawl and ratchet connection the feed bars are revolved one to the right and the other to the left as before stated.

Each housing is formed with a longitudinally extending perforated ear 39 which is hinged to perforated ears 40 of one of the slide blocks 41 42, the hinge joint being shown at 43. These blocks 41 42 are vertically perforated for their respective bolts 15 and 16 which pass through the frame timbers, the saw holder and these blocks, the nuts 46 on the bolts securing the parts in operative position.

The disks 29' and 30' are provided with upwardly projecting pintles as 47 and upon these pintles the socketed posts 18 are swiveled. The posts 48 are pivoted at 49 50 at the ends of a cross arm 51 and this cross arm is supported on the swivel connections and a bracket 52 projecting forwardly from the center of the arm and provided with a central slot 53 through which the stud 14 of the column 7 projects. In this manner a flexible connection is made between the laterally reciprocable saw holder and the post 7 so that when the saw is reciprocated laterally the cross arm 51 swings on the stud 14 as a center. Now assuming the saw holder to be moving to the right in Fig. 1 it will be seen that the stud 14 is carried to the right and the bracket arm through its slotted connection to the stud is carried with it. The movement of the cross arm which is flexibly supported on its swivel points 47 revolves the ratchet 32 and turns the bar 24 over to the right. This turning of this bar, which it will be remembered is threaded in the stationary nut 25, causes the right side of the saw holder to swing forward on the column 7 as a pivot, with the result that the saw blade cuts the rounded kerf at the right side of the tree as shown. As the motor reverses the reciprocating movement of the saw holder and pulls the holder to the left, the screw bar 24 remains idle, but the swinging of the cross arm 51 now turns the screw bar 23 and the left end of the saw holder is swung to the front and the right and withdrawn, causing the saw blade to complete the curved kerf as shown in Fig. 1. This action is termed the woodman's swing and it facilitates the manipulation and operation of the saw in felling trees. As thus described the saw holder is fed step by step at alternate sides, and the bolt heads 17 travel in the grooves 18 toward the tree, the whole movable part of the device moving forward on the frame of the machine with an intermittent oscillating and laterally reciprocating motion. At the rear of the frame a pair of jacks 48 and 49 are illustrated for elevating this portion of the machine, and at the front of the timbers 19 19' a pair of rollers 50 50 are journaled in the pivoted brackets 51 51'. The pivotal points of the brackets are stud shafts 52 53 which carry bevel gears 54 55 respectively and these gears mesh with complementary gears 56 57 on the respective shafts 58 and 59 journaled in the frame of the machine and revoluble in their bearings 60 by handles 61. By means of set screws 62 the stud shafts 52 53 are made rigid with their respective brackets, so that when the handles 61 are turned to revolve the shafts 58 or 59 it will be seen that the roller brackets are raised or lowered in altitude and in this manner the forward part of the frame may be adjusted to overcome irregularities in the ground as the brackets are adjusted separately, or adjusted to the proper height for sawing as required.

The hinged joint of the screw bars permits them to be raised from their boxes 26 to vertical position so that the machine may be carried through the woods and in this connection the handles 63 may be utilized. When the bars are raised it will be understood the nuts 25 are lifted bodily from the boxes 26 and the dimension of the machine in one direction is thus diminished.

In Fig. 3 I have illustrated a telescopic pole 64 which is one of a pair of such poles used so that when the tree has been sawed part way through the operator can extend the pole to lift the weight of the tree from the saw to facilitate its operation, and further to throw the tree from the saw when it is felled.

The machine is usually operated by two men, and an engine or motor of small horse power, while one horse may draw the machine from place to place, on a "scoot" when it is to be transported.

What I claim is:—

1. The combination in a sawing machine with its slotted frame, slotted laterally reciprocable saw holder and guide bolts in said slotted members, means for moving the saw, and means for alternately moving said guide bolts to impart a combined reciprocating and oscillating movement to the saw holder.

2. A sawing machine comprising a slotted frame, a slotted laterally reciprocable saw holder, and spaced guide bolts therefor, a feed device including a screw bar for each bolt, and means for turning said bars alternately.

3. A sawing machine comprising a slotted frame, a slotted laterally reciprocable saw holder and spaced guide bolts therefor, a feed device including a screw bar for each bolt, and a ratchet wheel on each screw bar, a pair of posts carrying pawls to co-act with the ratchets, a cross bar connecting the posts, and means for reciprocating said cross bar for turning said screw bars alternately.

In testimony whereof I affix my signature.

MOSES J. BLAIN.